United States Patent
Gress et al.

(10) Patent No.: US 7,308,477 B1
(45) Date of Patent: Dec. 11, 2007

(54) UNIFIED MESSAGING SYSTEM CONFIGURED FOR TRANSPORT OF ENCRYPTED MESSAGES

(75) Inventors: David Stephen Gress, Mechanicsville, VA (US); Robert Raymond Sealey, Brighton Victoria (AU)

(73) Assignee: Cisco Technology, Inc., San Jose, CA (US)

( * ) Notice: Subject to any disclaimer, the term of this patent is extended or adjusted under 35 U.S.C. 154(b) by 754 days.

(21) Appl. No.: 09/756,697

(22) Filed: Jan. 10, 2001

(51) Int. Cl.
G06F 15/16 (2006.01)

(52) U.S. Cl. .................. 709/206; 709/203; 709/217; 709/219; 379/277; 379/279; 455/466

(58) Field of Classification Search ............ 709/206, 709/202, 246, 219, 249, 203, 223–229, 217; 713/152, 151; 379/67.1, 88.09, 88.13, 902; 380/277, 279
See application file for complete search history.

(56) References Cited

U.S. PATENT DOCUMENTS

| | | | |
|---|---|---|---|
| 4,837,798 A | | 6/1989 | Cohen et al. |
| 5,608,786 A | * | 3/1997 | Gordon ................ 709/206 |
| 5,675,507 A | * | 10/1997 | Bobo, II ................ 709/206 |
| 5,870,477 A | * | 2/1999 | Sasaki et al. ............. 713/165 |
| 6,233,318 B1 | * | 5/2001 | Picard et al. ............ 379/88.17 |
| 6,289,105 B1 | * | 9/2001 | Murota ................ 713/152 |
| 6,304,898 B1 | * | 10/2001 | Shiigi ................ 709/206 |
| 6,356,937 B1 | * | 3/2002 | Montville et al. ......... 709/206 |
| 6,374,292 B1 | * | 4/2002 | Srivastava et al. ......... 709/206 |
| 6,412,079 B1 | * | 6/2002 | Edmonds et al. .......... 714/11 |
| 6,424,718 B1 | * | 7/2002 | Holloway ............... 380/281 |
| 6,442,600 B1 | * | 8/2002 | Anderson ............... 709/217 |
| 6,507,817 B1 | * | 1/2003 | Wolfe et al. ............. 715/513 |
| 6,549,612 B2 | * | 4/2003 | Gifford et al. ........... 379/88.17 |
| 6,584,564 B2 | * | 6/2003 | Olkin et al. .............. 713/152 |
| 6,601,170 B1 | * | 7/2003 | Wallace, Jr. ............. 713/165 |
| 6,629,122 B1 | * | 9/2003 | Yotsukura .............. 719/315 |
| 6,661,877 B1 | * | 12/2003 | Lee et al. ............... 379/67.1 |
| 6,665,709 B1 | * | 12/2003 | Barron ................. 709/203 |
| 6,671,355 B1 | * | 12/2003 | Spielman et al. .......... 709/230 |
| 6,678,698 B2 | * | 1/2004 | Fredell et al. ............ 707/10 |
| 6,711,264 B1 | * | 3/2004 | Matsumoto et al. ....... 380/283 |
| 6,711,608 B1 | * | 3/2004 | Ogilvie ................. 709/206 |
| 6,741,705 B1 | * | 5/2004 | Nelson et al. ........... 379/93.24 |
| 7,024,209 B1 | * | 4/2006 | Gress et al. ............. 709/203 |
| 7,269,432 B2 | * | 9/2007 | Gress et al. ............. 455/466 |
| 2002/0049817 A1 | * | 4/2002 | Drory et al. ............. 709/206 |

\* cited by examiner

*Primary Examiner*—Ario Etienne
*Assistant Examiner*—Ramy M Osman
(74) *Attorney, Agent, or Firm*—Leon R. Turkevich (57) ABSTRACT

A unified messaging system is configured for encrypting messages. The calling party is prompted to encrypt the unified message, for example as part of an extended options menu. The unified messaging system encrypts the unified message based on an encryption key input by the user into an encrypted message, and generates an open-network destination header for identifying a destination location for the encrypted message according to an open-network protocol. The unified messaging system then outputs the open-network destination header and the encrypted message as an open-network encrypted message to an open-network message store. During retrieval of the message, the unified messaging system identifies the encrypted message and prompts the destination subscriber for a decryption key; the unified messaging system performs a decryption operation to recover a decrypted file, and outputs the decrypted file for playback to the user.

70 Claims, 6 Drawing Sheets

UNIFIED MESSAGING SYSTEM CONFIGURED FOR TRANSPORT OF ENCRYPTED MESSAGES

BACKGROUND OF THE INVENTION

1. Field of the Invention

The present invention relates to unified messaging systems configured for receiving, storing, and supplying messages to a subscriber, independent of message format or the type of device used by the sender of the message or the subscriber accessing the messages.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary voice mail systems, such as the commercially-available Cisco Unified Open Network Exchange (Cisco uOne) (Products UONE-FOUND 4.1S, and UONE-VOICEMSG4.1S) from Cisco Systems, Inc., enables service providers to use scalable and distributed systems using recognized communication protocols. Hence, the service providers may use such unified communications systems across multiple platforms, independent of protocol, for storage of unified messages (carrying e.g., voice messages, facsimile, and/or e-mail) stored in a centralized messaging store or distributed message stores. In particular, such unified communications systems may transfer unified messages to message stores according to a prescribed open network protocol, for example IMAP protocol via the Internet.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

Hence, open network-based systems such as the commercially-available Cisco uOne system (4.1S) or the system disclosed in application Ser. No. 09/480,485 enable the use of open-network systems such as IMAP message stores, or LDAP directories accessible via an IP-based network such as the Internet, enabling worldwide deployment based on IP-based access protocols. The Internet, however, is recognized to have security risks; hence, there is a concern about transporting sensitive information such as unified messages carrying voice messages, facsimile, and/or e-mail via a medium that is susceptible to eavesdropping.

SUMMARY OF THE INVENTION

There is a need for an arrangement that enables use of open standards-based unified messaging systems to receive, store, and/or send unified messages in a secure manner.

There also is a need for an arrangement that enables an open standards-based unified messaging system to encrypt unified messages carrying, for example, voice messages, facsimile, and/or e-mail messages, to ensure secure transmission across an open standards-based network such as the Internet.

These and other needs are attained by the present invention, where a unified messaging system is configured for encrypting messages based on a user selection. The unified messaging system provides a user interface session enabling a party desiring to leave a message (i.e., calling party) for a destination subscriber according to a selected unified messaging format, for example voice, fax, e-mail, Short Message Service, etc. During the user interface session, the calling party is prompted to encrypt the unified message having the message according to the selected unified messaging format, for example as part of an extended options menu. In response to detecting an encryption selection from the user, the unified messaging system sends a key prompt for the user to select an encryption key. The unified messaging system encrypts the unified message based on the encryption key into an encrypted message, and generates an open-network destination header for identifying a destination location for the encrypted message according to an open-network protocol.

The unified messaging system then outputs the open-network destination header and the encrypted message as an open-network encrypted message to an open-network message store. During retrieval of the message by the unified messaging system (e.g., the same messaging system or another unified messaging system serving a destination subscriber), the unified messaging system identifies the encrypted message and prompts the destination subscriber for a decryption key; the unified messaging system performs a decryption operation configured for generating a decrypted file from the encrypted message based on the decryption key, and outputs the decrypted file for playback to the user, where a match between the encryption key and the decryption key enables recovery of the unified message. Hence, unified communications may be implemented using secure encryption resources, with minimal modifications to the unified communications systems.

One aspect of the present invention provides a method in a unified communications system. The method includes receiving a request for a user interface session to enable a user to leave a message for an identified destination subscriber. A first prompt is generated enabling the user to select encryption of the message, and a second prompt is generated, based on the user selecting encryption of the message, for the user to supply an encryption key. The method also includes causing encryption of the message into an encrypted message based on the encryption key supplied by the user, and outputting the encrypted message to a determined destination based on determined subscriber profile attributes for the identified destination subscriber.

Another aspect of the present invention provides a method in a unified communications system. The method includes receiving a request for a user interface session to enable a messaging subscriber to retrieve stored messages, and accessing subscriber profile information from a subscriber profile directory according to a prescribed open network protocol. The method also includes determining one of the stored messages is encrypted based on access of a message store according to a prescribed open network protocol and based on the accessed subscriber profile information. A prompt is generated, based on identifying the one stored message as encrypted, for the messaging subscriber to supply a decryption key, and decryption of the one stored message is attempted based on the decryption key supplied by the messaging subscriber.

Still another aspect of the present invention provides a unified communications server including an interface configured for receiving a request for a user interface session to enable a user to leave a message for an identified destination subscriber, an IP-based interface, and an application runtime environment. The IP-based interface enables retrieval of subscriber profile attributes for the identified destination subscriber from an IP-based subscriber profile directory, and storage of messaging information for the identified destination subscriber in an IP-based subscriber message store. The application runtime environment is configured for generating the user interface session and accessing the subscriber profile attributes, and generating first and second prompts enabling the user to select encryption of the message and input an encryption key, respectively. The application runtime environment also causes the message to be encrypted into an encrypted file based on the encryption key supplied by the user, and outputs an encrypted message including the encrypted file for storage in the IP-based subscriber message store for the identified destination subscriber.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to secure transfer of unified messages by unified communications systems based on encrypting the unified messages into encrypted messages using available executable encryption routines. In particular, a user desiring to leave a message is prompted during a user interface session to select encryption of the message, and supply an encryption key. The unified messaging system causes encryption of the message into an encrypted message, for example by invoking a prescribed encryption utility. In addition, the unified messaging system generates an identifiable tag, for example a MIME extension, that specifies that the associated file is encrypted, enabling a messaging system having retrieved the message to identify that decryption is necessary to recover the original message. The unified messaging system then outputs the encrypted message to a determined destination via an IP-based network, for example according to SMTP or IMAP protocol, to a destination subscriber message store based on determined subscriber profile attributes for an identified destination subscriber.

Once the encrypted message is stored in the destination subscriber message store, the destination subscriber may retrieve the message using, for example, a messaging system. The messaging system, which may be the same unified messaging system used to encrypt the original message or the destination subscriber's assigned messaging system, determines that the message is encrypted based on the associated tag, and prompts the user for a decryption key. The messaging system then attempts decryption of the stored message by invoking a prescribed encryption utility for generation of a decryption result based on the decryption key, and outputs the decryption result to the user. Hence, a match between the encryption key and the decryption key results in successful decryption of the original message, whereas a mismatch in the encryption and decryption keys results in erroneous data being sent to the user.

Hence, unified messages can be securely transferred across an IP based network such as the Internet, with minimal processing requirements by the unified messaging systems serving as session servers for the party leaving a message and the party retrieving and message. Hence, the encryption and decryption operations do not adversely affect scalability of the unified messaging systems.

A description will be provided of the unified messaging architecture, followed by a description of the method for encrypting and decrypting unified messages.

Figure 1:
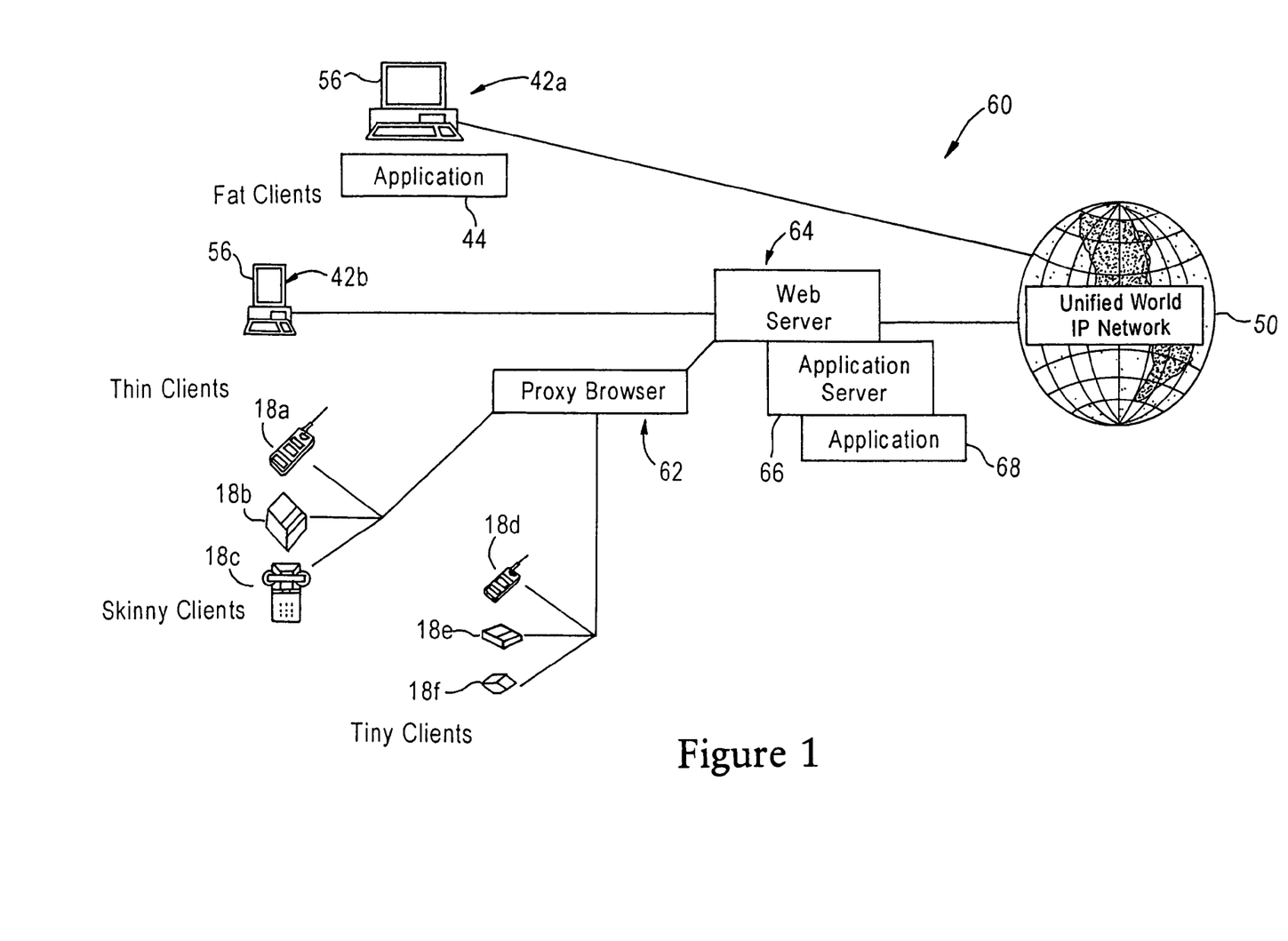
FIG. 1 is a block diagram illustrating an system enabling deployment of a unified messaging system, capable of executing voice enabled web applications, according to an embodiment of the present invention.

FIG. 1 is a block diagram illustrating an architecture that provides unified voice messaging services and data services via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications. For example, the web server 64 may access the application server 66 across a common gateway interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., XML pages that define an application) and in response generate new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

Figure 2:
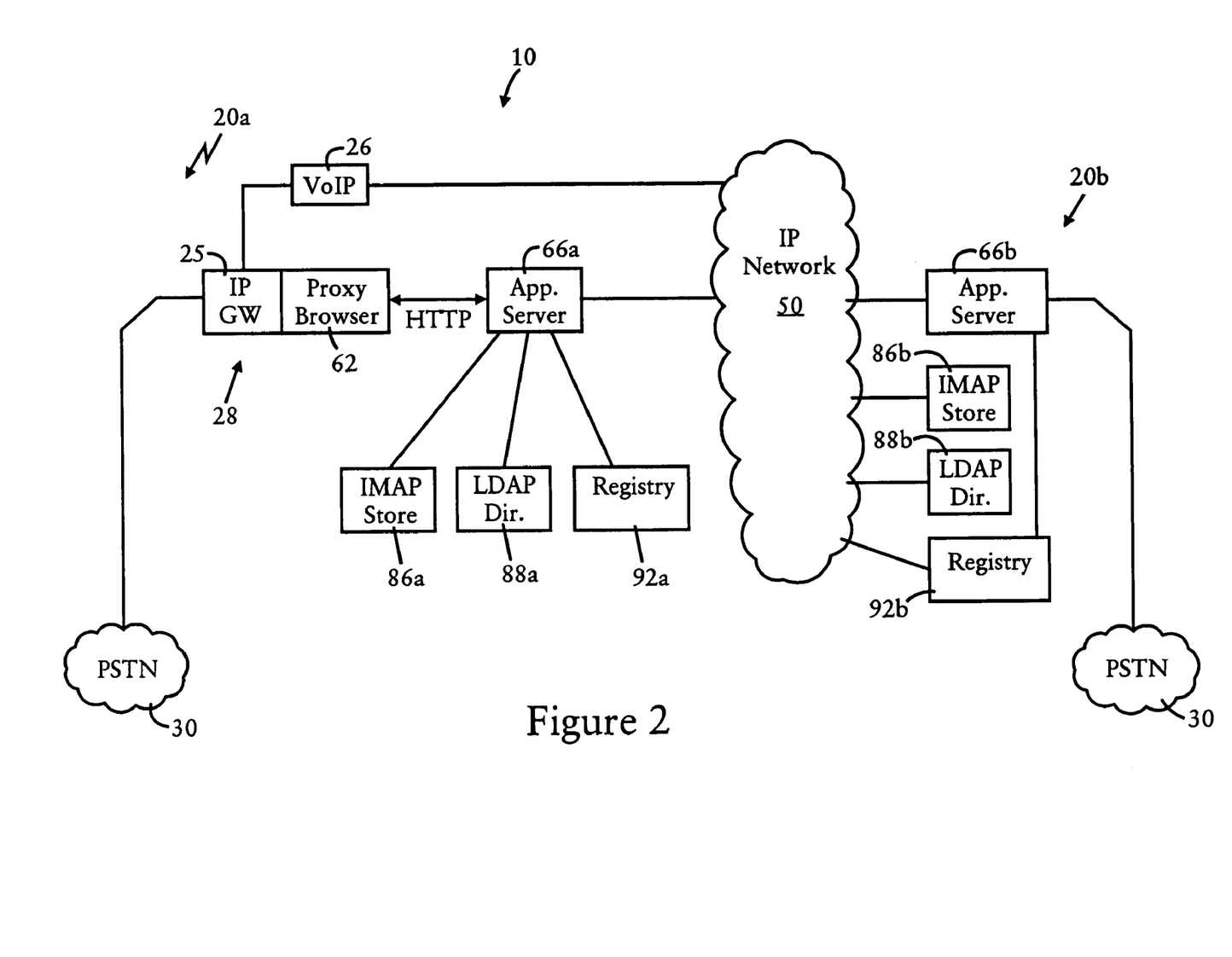
FIG. 2 is a block diagram illustrating a unified messaging system configured for sending and receiving encrypted messages according to an embodiment of the present invention.

FIG. 2 is a diagram illustrating a communications system 10 having unified communications systems 20 for secure internetwork communications using the application server 66 according to an embodiment of the present invention. The unified communications system is illustrated in the context of voice messaging, although the arrangement of secure communications of unified messages encompasses different type messages, including voice, fax, e-mail, Short Message Service, etc.

The unified communications system 20 includes a proxy device 28 (e.g., a gate server) configured for terminating incoming calls (e.g., voice calls, fax calls, etc.) from the public switched telephone network 30, SMS messages received according SMPP protocol, e-mail messages received according to SMTP protocol, etc. The proxy device 28 includes an IP gateway 25 and a proxy browser 62, serving as an IP and HTTP interface for a voice over IP resource 26 and the application server 66a, respectively. The application server 66a is configured for accessing according to IP protocol an IMAP message store (i.e., messaging server) 86a, an LDAP directory (i.e., database server) 88a, and a registry 92a of active users having an ongoing session with the application server 66a, described in further detail with respect to FIG. 3. Since the application server 66a is configured for accessing the IMAP message store directory 86a, the LDAP directory 88a, and the registry 92a according to IP protocol, the application server 66a is able to access any directory having a valid IP address via the IP network 50, including the directories 86b and 88b associated with the unified communications system 20b. In particular, the application server 66a can either directly access subscriber profile information from the LDAP directory 88b via the IP network 50, or the application server 66a may send a request to the LDAP directory 88a, relying on the LDAP directory 88a to search and retrieve from the LDAP directory 88b the necessary subscriber profile information for a roaming subscriber.

In addition, the access of the LDAP directory 88b and the IMAP message store 86b by the application server 66a enables the application server 66a to initiate a messaging operation, personalized on behalf of a destination subscriber, for a calling party attempting to reach the destination subscriber. In particular, an incoming call from the calling party terminated to the IP gateway 25 causes the browser 62 to initiate a messaging application session with the application server 66a by sending an HTTP request that includes the dialed number identification string (DNIS) of the destination subscriber. The application server 66a, in response to receiving the HTTP request including the DNIS of the destination subscriber, obtains the subscriber profile information from the LDAP directory 88b and possibly a personalized prompt from the IMAP message store 86b, enabling the application server 66a to provide for the calling party a messaging session on behalf of the destination subscriber.

Hence, the application server 66a can provide secure messaging services for subscribers, without the necessity of telephony network facilities of the public switched telephone network 30. Hence, the application server 66a can provide portable application services based on accessing subscriber profile information via the IP network 50.

Figure 3:
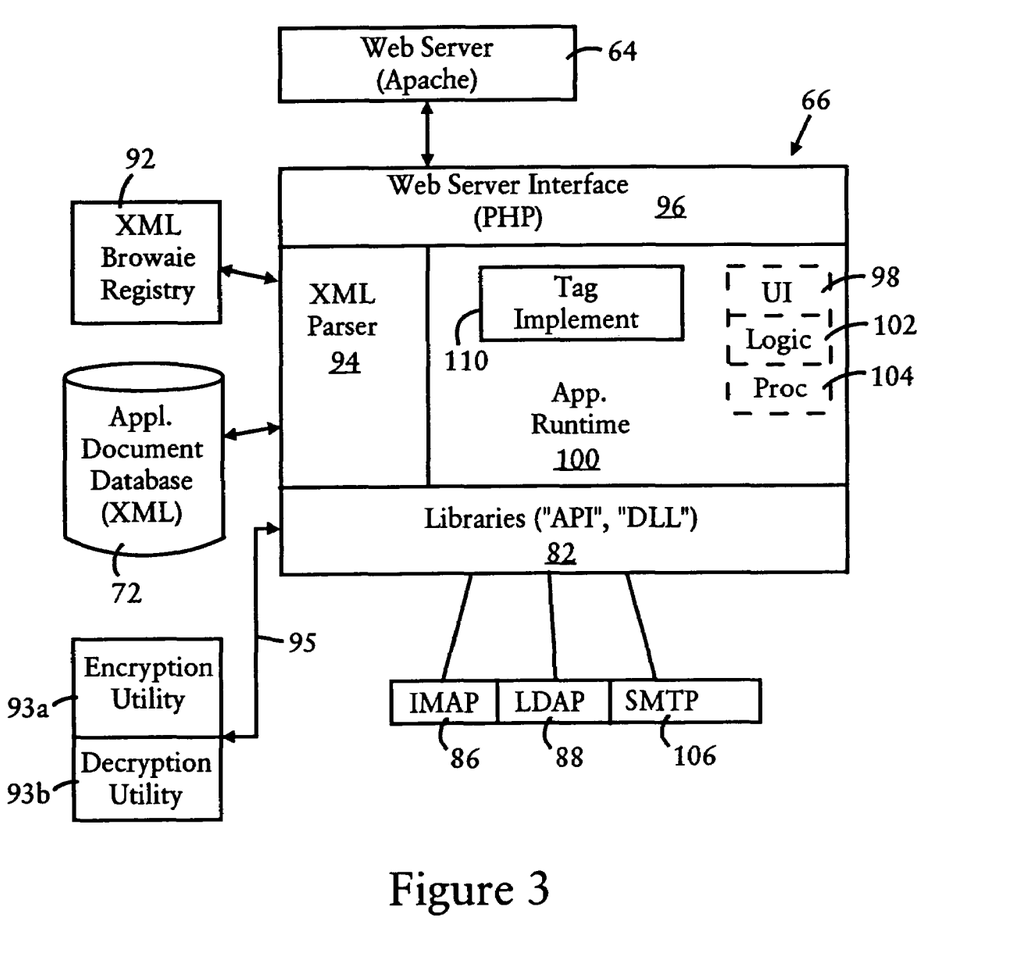
FIG. 3 is a diagram illustrating an implementation of the unified messaging server of FIG. 1.

FIG. 3 is a diagram illustrating one implementation of the application server 66. As suggested above, one exemplary implementation of the application server 66 is the commercially-available Cisco Unified Open Network Exchange (Cisco uOne) (Products UONE-FOUND 4.1S, and UONE-VOICEMSG4.1S) from Cisco Systems, Inc., modified to include access to encryption and decryption resources for secure transport of unified messages. However, another implementation, described below with respect to FIG. 3 and as originally disclosed in the above-incorporated application Ser. No. 09/480,485, utilizes XML documents to define application operations to be performed.

The application server 66 receives via the web server 64 HTTP requests from either a PC-based web browser 42 capable of supplying full media content (e.g., audio, text, images, and streaming video), or a proxy browser 62 configured for serving as an HTTP interface for a user input device, such as a telephone 18, having limited media capabilities (e.g., audio only). In response to receiving the HTTP requests, the voice application server 66 accesses a selected XML document based on parameters specified within the HTTP request (e.g., commands specified within the URL), and based on application state determined from accessing a brownie, assuming the HTTP request specifies a valid session identifier. As described below, the application runtime environment within the voice application server 66 parses the XML tags within the accessed XML document, and dynamically generates an HTML page having XML tags that specify media content (e.g., .wav files) and control information for playing the media files by the corresponding browser.

The voice application server 66 is configured for accessing service application programming interfaces (API's) 82 to resources based on prescribed procedures that may be called during parsing of an XML tags in a selected XML document. As described below, the application server 66 issues function calls to an API 82 for accessing the resources for prescribed operations, enabling the deployment of a robust, scalable unified messaging system having messaging operations distributed across multiple platforms. In particular, the application server 66 accesses subscriber profile information from an IP-based database server 84 according to LDAP protocol. As described below, the application server 66 is configured for storing and retrieving messages in a standardized format (e.g., e-mail with binary encoded attachments) in an IMAP messaging server 86. In addition, the application server 66 may issue function calls for a text to speech resource, or an outgoing fax server, in order to deliver different-format messages to users, depending on the capability of the user devices. Hence, the voice application server 66 may access the text to speech resource for converting an e-mail message into a audio-based message to be played for the user of the telephony device 18. Similarly, the voice application server 66 may determine that the proxy browser 62 does not interface with a telephony gateway device having facsimile transmission capabilities, hence the fax message retrieved from the IMAP message store 86 would be sent to the outgoing fax server for retransmission to another telephone number identified as serving a fax machine.

According to the disclosed embodiment, the API 82 also is used to invoke an encryption utility 93a or a decryption utility 93b, that may be executable either on the application server 66 or on another server via a secure link 95. Additional details of using the encryption utility 93a and the decryption utility 93b are described below with respect to FIGS. 4, 5A and 5B. The application server 66 is implemented as a server executing a PHP hypertext processor with XML parsing and processing capabilities, available open source on the Internet at http://www.php.net. As shown in FIG. 3, the server system 66 includes an XML parser 94 configured for parsing the application-defining XML documents stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 that may be implemented as dynamically linked libraries (DLLs) or application programming interface (API) libraries. The libraries 82 enable the runtime environment 100 to implement the procedures 104 as specified by the appropriate XML document. For example, the application server 66 may issue a function call to one of a plurality of IP protocol compliant remote resources 86, 88, or 106 according to IMAP protocol, LDAP Protocol, or SMTP protocol, respectively, described below. For example, the PHP hypertext processor includes executable routines capable of accessing the IMAP or LDAP services. Note that the mechanisms for accessing the services 86, 88, or 106 should be established within the application server before use of XML documents that reference those services. Once the services 86, 88, or 106 are established, the application runtime environment 100 can perform a function operation by using executable functions specified by a function call rule set.

Figure 4:
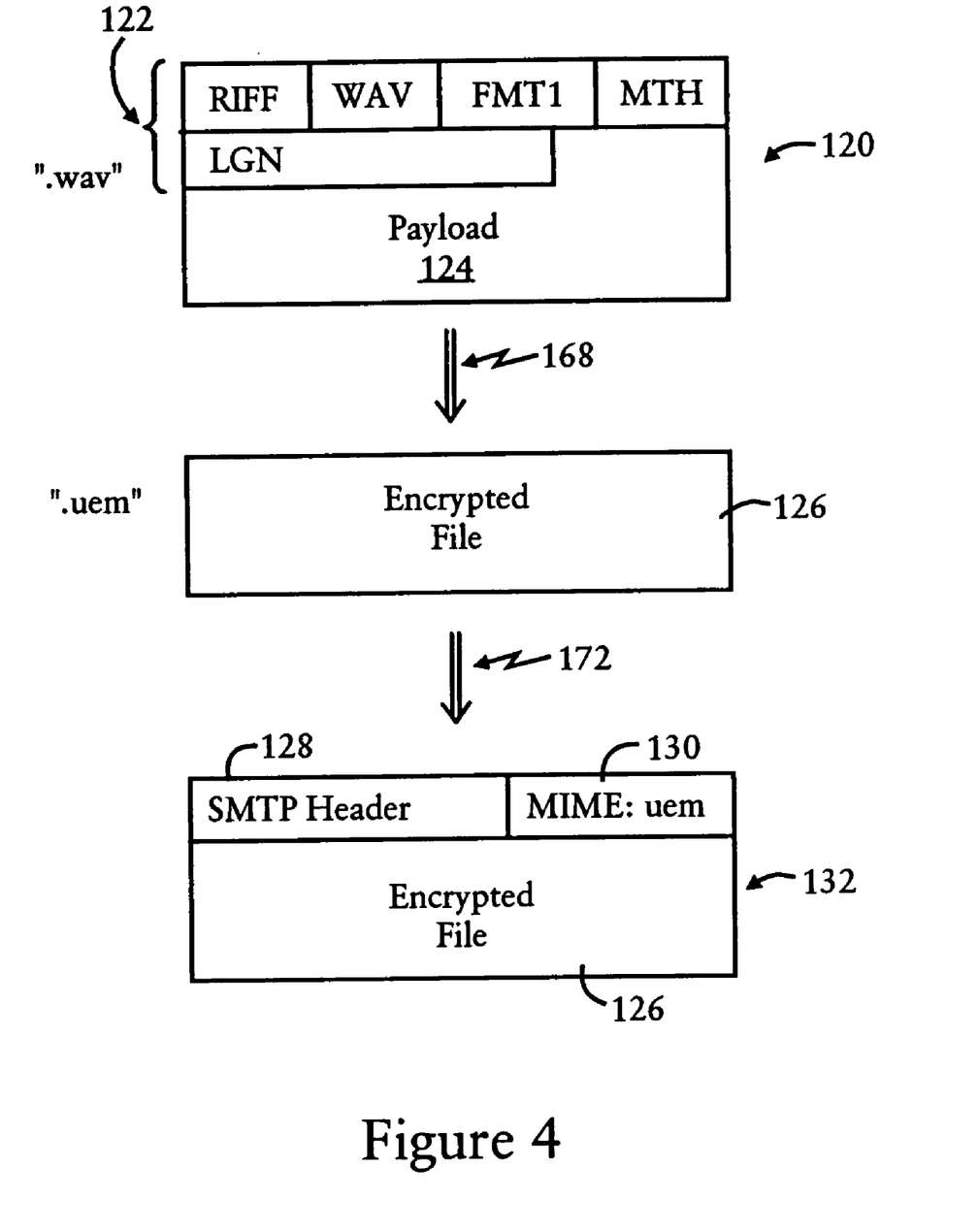
FIG. 4 is a diagram illustrating the generation of an encrypted message by the unified messaging system of FIG. 1.
Figure 5A:
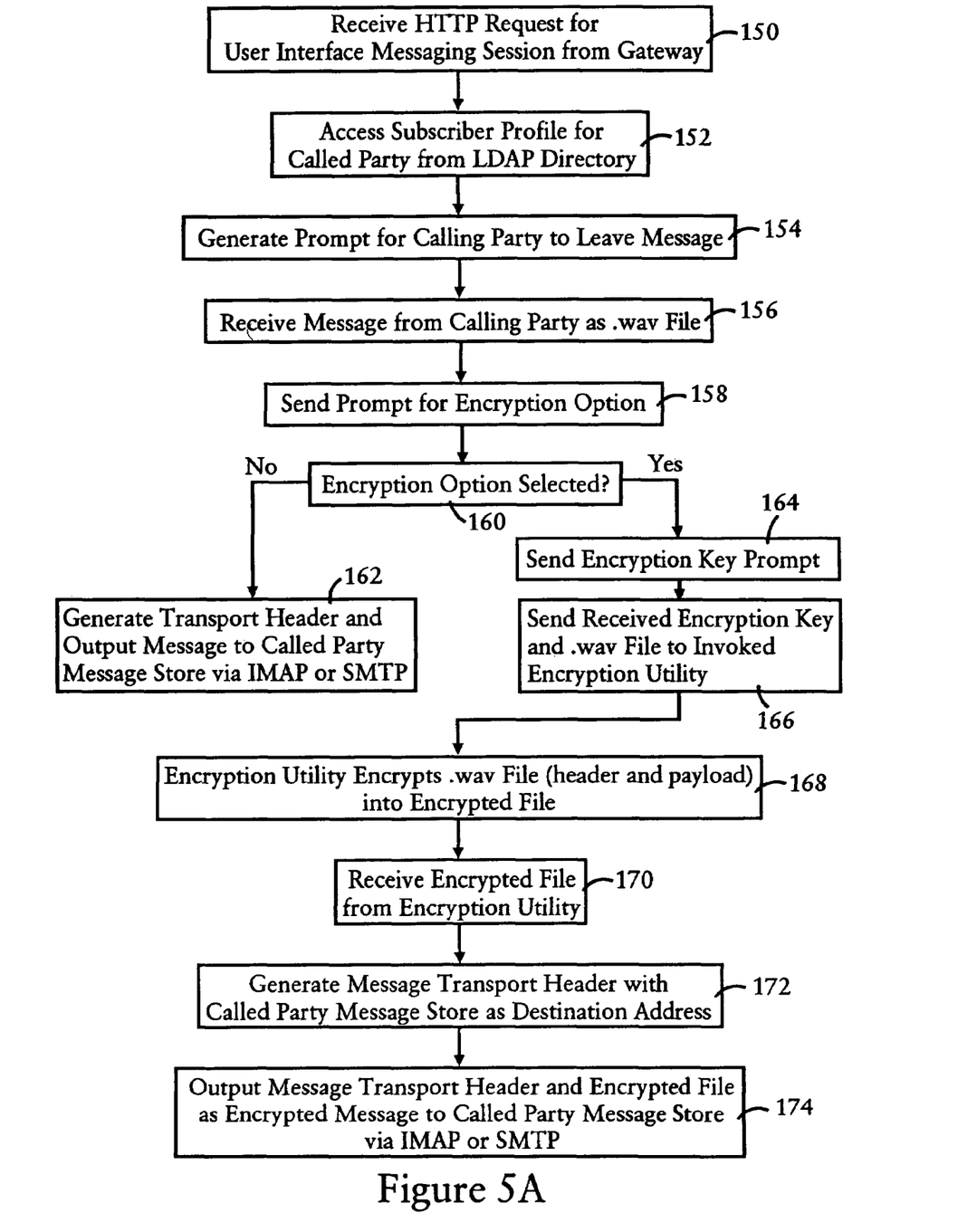
FIGS. 5A and 5B are diagrams summarizing the method of encrypting and decrypting messages, respectively by the unified messaging server according to an embodiment of the present invention.
Figure 5B:
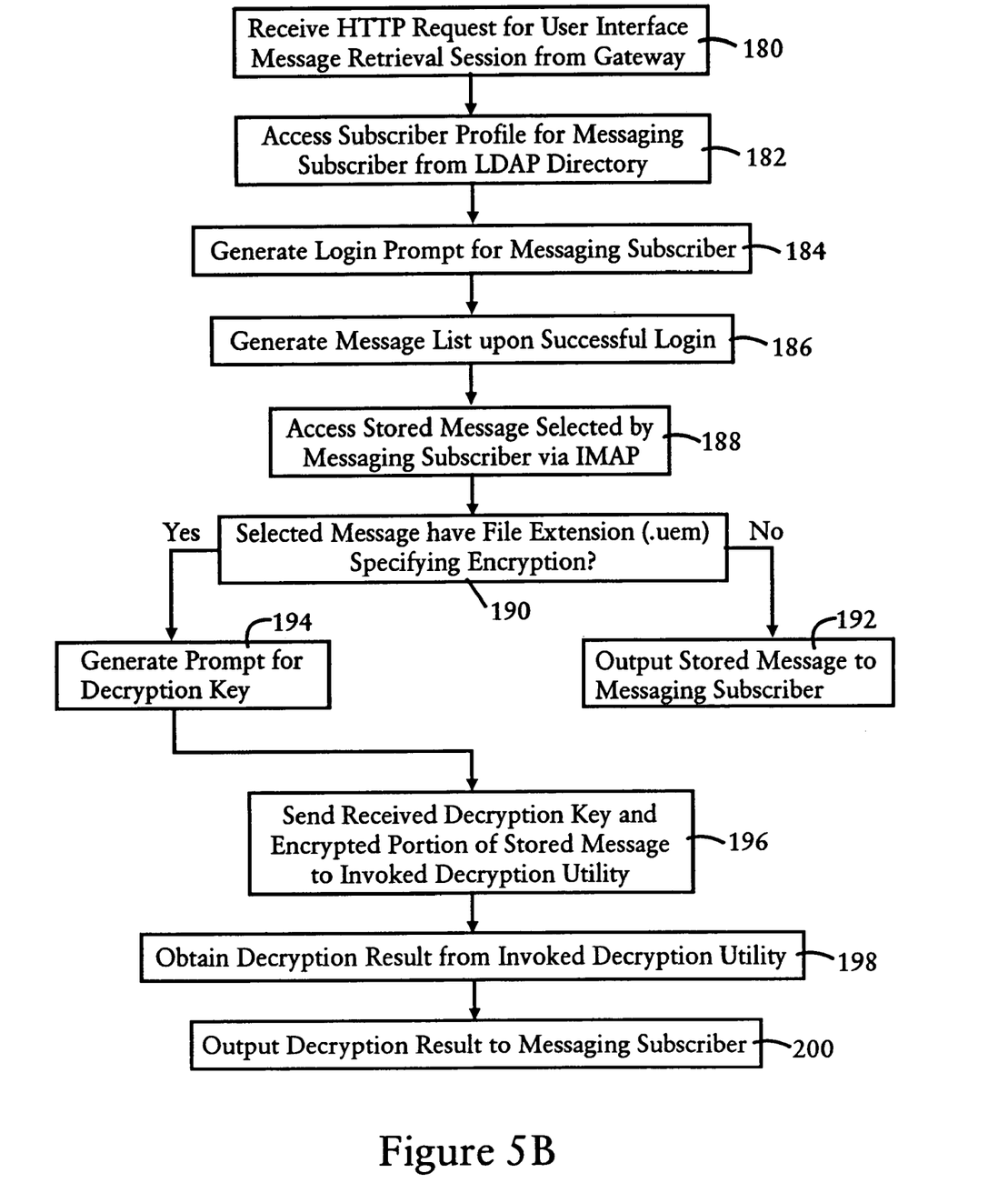

FIG. 4 is a diagram illustrating encryption of a message into an encrypted message for secure transmission of the message across an IP connection according to an embodiment of the present invention. FIG. 5A is a diagram illustrating the method of encrypting the message of FIG. 4 into an encrypted message for secure transmission according to an embodiment of the present mention. In addition, FIG. 5B is a diagram illustrating the method of retrieving and decrypting a stored message by a messaging subscriber according to an embodiment of the present mention. The steps described in FIGS. 5A and 5B can be implemented as executable code stored on a computer readable medium (e.g., a hard disk drive, a floppy drive, a random access memory, a read only memory, an EPROM, a compact disc, etc.).

The method of encrypting a message begins in step 150, where an application server 66 (e.g., 66a) receives an HTTP request from a browser 62 serving a corresponding IP gateway 25 for a user interface messaging session. The application server 66a responds to the HTTP request by accessing in step 152 an LDAP directory 88a or 88b for the called party, identified for example based on the supplied DNIS. The application server 66a generates in step 154 a prompt for the calling party to leave a message, for example by providing to the proxy browser 62 a generic prompt or a personalized prompt retrieved from the called party IMAP message store 86. The proxy browser 62, upon receiving the prompt from the application server 66 (e.g., in the form of a web page having XML media and control tags for playing of the .wav prompt), plays the prompt for the calling party and records the message as a .wav file 120, illustrated in FIG. 4; upon completing recording of the message in the .wav file, the proxy browser 62 posts the .wav file to a prescribed URL specified in the web page from the application server 66 via a secure link.

As shown in FIG. 4, the .wav file 120 includes an audio header 122 and an audio payload 124. The audio header 122 includes known fields (e.g., RIFF, WAV, Format (FMT), Method (MTH), Length (LGN)) enabling a media player to decode and playback the payload 24 as playable audio.

The application server 66, in response to receiving the .wav file 120 storing the message from the calling party in step 156, sends a prompt in step 158 enabling the calling party to specify an encryption option. If in step 160 the calling party does not select encryption, the application server 66 generates in step 162 a transport header (e.g., an SMTP header) and outputs the unencrypted message to the called party message store 86 via IMAP or SMTP. If, however, the application server 66 determines in step 160 that the calling party selects encryption, the application server 66 sends in step 164 an encryption key prompt for the calling party to enter an encryption key. Upon receiving the encryption key from the calling party, the application server 66 sends in step 166 the received encryption key and .wav file 120 to the invoked encryption utility 93a, illustrated in FIG. 3.

The encryption utility 93a encrypts in step 168 the .wav file 120, including header 122 and payload 124, into an encrypted file 126 illustrated in FIG. 4. The application server 66 receives in step 170 the encrypted file 126, and generates in step 172 a message transport header 128 and a MIME extension ".uem" 130 for the encrypted file 126 identifying the received file as encrypted. The application server 66 outputs in step 174 the resulting encrypted message 132 to the called party message store 86 via IMAP or SMTP protocol.

FIG. 5B is a diagram illustrating the method of retrieving an encrypted message by the application server 66 for a messaging subscriber according to an embodiment of the present invention. The message begins in step 180, where the application server 66 receives an HTTP request for a user interface message retrieval session for the messaging subscriber from the proxy browser 62 on behalf of the IP gateway 25. The application server 66 in response accesses the subscriber profile information for the messaging subscriber from the LDAP directory 88 in step 182, and generates a login prompt for the messaging subscriber in step 184. Upon successful login by the messaging subscriber, the application server 66 accesses the messaging subscriber's IMAP message store 86 and generates a message list in step 186. For example, the message list may specify that the messaging subscriber has three voice messages, two fax messages, two e-mail messages, and one SMS message.

In response to receiving a selection input from the messaging subscriber, the application server 66 accesses in step 188 the stored message selected by the messaging subscriber from the message store 86 according to IMAP protocol. Upon retrieving the message, for example the encrypted message 132, the application server 66 parses the MIME header field 130 to determine in step 190 whether the selected message has a file extension (e.g., ".uem") that specifies encryption.

If the retrieved message does not have a file extension specifying encryption, the application server outputs the stored message in step 192 for playback to the messaging subscriber. However, if the application server 66 determines in step 190 that the MIME header field 130 specifies the attached file is encrypted, the application server 66 generates in step 194 a prompt for a decryption key. The prompt is output to the proxy browser 62, which collects a decryption key input from the messaging subscriber.

The application server 66, in response to receiving the decryption key from the messaging subscriber, sends in step 196 the received decryption key and the encrypted portion 126 of the stored message to the invoked decryption utility 93b, illustrated in FIG. 3. The actual decryption operation by the decryption utility 93b is essentially the reverse of the encryption operation illustrated in FIG. 4. The application server obtains the decryption results from the invoked encryption utility 93b in step 198, and outputs in step 200 the decryption result to the proxy browser 62 for attempted playback to the messaging subscriber.

Hence, the application server 66 forwards the decryption result to the proxy browser 62, regardless of whether there is a match between the encryption key used to encrypt the file 126, and the decryption key used to attempt decryption of the encrypted file 126. Hence, use of commercially available encryption and decryption utilities 93, as well as the passing of the decryption result to the proxy browser 62 handling the message retrieval session, ensures that the application server 66 maintains scalability and security by minimizing involvement in the encryption and decryption operations.

According to the disclosed embodiment, unified messages managed by unified messaging systems can be securely transported across an open protocol based network, such as the Internet, without compromising security or adversely affecting the operational performance of the unified messaging systems.

Although the disclosed embodiment describes performing encryption and decryption by the application server 66 using locally accessible encryption and decryption utilities 93, encryption and decryption also may be performed by the user session interface, for example the proxy browser 62.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a unified communications system, the method comprising:

receiving from a requesting device a request for providing a user interface session by the unified communications system to enable a user of the requesting device to send a message to an identified destination subscriber;

receiving, by the unified communications system, the message in unencrypted form from the requesting device as part of the user interface session;

generating and outputting to the requesting device as part of the user interface session a first prompt enabling the user to select encryption of the message;

generating and outputting to the requesting device as part of the user interface session a second prompt, based on the user selecting encryption of the message, for the user to input an encryption key;

invoking a resource configured for executing encryption of the message, having been received in unencrypted form, into an encrypted message based on the encryption key received from the requesting device as part of the user interface session, the resource and the executing encryption being distinct from the requesting device; and outputting the encrypted message to a determined destination based on determined subscriber profile attributes for the identified destination subscriber.

2. The method of claim 1, wherein the receiving of the message includes receiving a message data file having the message and a Multipurpose Internet Mail Extension (MIME) that specifies a format of the message, the invoking including encrypting the message data file into an encrypted file having a MIME extension specifying that the encrypted file has an encrypted format.

3. The method of claim 2, further including generating a message transport header specifying an IP based destination address corresponding to the identified destination subscriber.

4. The method of claim 2, wherein the message data file has a MIME extension specifying a ".wav" format, the message having an audio header and audio payload, the invoking including encrypting the audio header and the audio payload within the encrypted file.

5. The method of claim 1, further comprising determining the subscriber profile attributes for the identified destination subscriber based on accessing a subscriber directory according to Lightweight Directory Access Protocol (LDAP), the subscriber profile attributes specifying the determined destination.

6. The method of claim 1, wherein the outputting includes outputting the encrypted message to the determined destination according to at least one of SMTP protocol and IMAP protocol.

7. The method of claim 1, further comprising:

receiving from a second requesting device a request for providing a second user interface session by the unified communications system to enable the identified destination subscriber using the second requesting device to retrieve stored messages;

retrieving for the second user interface session information related to the stored messages for the identified destination subscriber;

detecting one of the stored messages as encrypted;

generating for the second requesting device as part of the second user interface session a third prompt, based on detecting the one stored message, for the identified destination subscriber to input a decryption key; and supplying the decryption key having been received from the second requesting device as part of the second user interface session and the one stored message to an invoked decryption utility for decryption of the one stored message into a decrypted data file, the invoked decryption utility and the decryption distinct from the requesting device and the second requesting device.

8. The method of claim 7, further comprising outputting a decryption result, having been received from the invoked decryption utility relative to the supplying of the decryption key and one stored message, during the second user interface session to the identified destination subscriber, independent of the encryption key matching the decryption key.

9. The method of claim 1, wherein the receiving of the request includes receiving the request according to hypertext transport protocol, each of the generating the first prompt and generating the second prompt including sending a corresponding HTML page specifying the corresponding prompt, the receiving of the message includes receiving the message as an HTTP post to a prescribed uniform resource location.

10. A method in a unified communications system, the method comprising:
receiving from a requesting device a request for providing a user interface session by the unified communications system to enable a messaging subscriber using the requesting device to retrieve stored messages;
accessing, for the user interface session, subscriber profile information from a subscriber profile directory according to a prescribed open network protocol, the subscriber profile directory distinct from the requesting device;
determining one of the stored messages is encrypted based on access of a message store according to a prescribed open network protocol and based on the accessed subscriber profile information;
generating and outputting to the requesting device as part of the user interface session a prompt, based on identifying the one stored message as encrypted, for the messaging subscriber to input a decryption key; and
invoking a resource configured for attempting decrypting of the one stored message based on the decryption key having been supplied by the messaging subscriber via the requesting device as part of the user interface session, the resource and the attempting decrypting being distinct from the requesting device.

11. The method of claim 10, further comprising:
obtaining a decryption result based on the invoking of the resource; and
outputting the decryption result for attempted presentation to the messaging subscriber.

12. The method of claim 11, wherein the outputting step includes outputting the decryption result independent of whether the decryption key enabled successful decryption of the one stored message.

13. The method of claim 10, further comprising obtaining, based on the invoking of the resource, a decryption result including a message data file having a message and a Multipurpose Internet Mail Extension (MIME) that specifies a format of the message.

14. The method of claim 10, wherein the receiving of the request includes receiving the request according to hypertext transport protocol, wherein the generating of the prompt includes outputting a first HTML page specifying the prompt.

15. The method of claim 10, wherein the accessing includes obtaining the subscriber profile information according to LDAP protocol.

16. The method of claim 15, wherein the determining includes:
accessing the message store according to IMAP protocol for messaging information related to the stored messages for the messaging subscriber, based on the accessed subscriber profile information; and
identifying the one stored message as encrypted based on a prescribed file extension specifying that the one stored message has an encrypted format.

17. The method of claim 16, wherein the identifying includes identifying the prescribed file extension as a MIME type extension that specifies an encrypted format.

18. The method of claim 10, wherein the determining includes:

accessing the message store according to IMAP protocol for messaging information related to the stored messages for the messaging subscriber, based on the accessed subscriber profile information; and
identifying the one stored message as encrypted based on a prescribed file extension specifying that the one stored message has an encrypted format.

19. The method of claim 18, wherein the identifying includes identifying the prescribed file extension as a MIME type extension that specifies an encrypted format.

20. A unified communications server including:
an interface configured for receiving a request from a requesting device for generation of a user interface session by the unified communications server to enable a user of the requesting device to send a message to an identified destination subscriber;
an IP-based interface enabling retrieval of subscriber profile attributes for the identified destination subscriber from an IP-based subscriber profile directory that is distinct from the requesting device, and storage of messaging information for the identified destination subscriber in an IP-based subscriber message store that is distinct from the requesting device; and
an application runtime environment configured for generating the user interface session and accessing the subscriber profile attributes, the application runtime environment configured for generating first and second prompts and outputting the first and second prompts to the requesting device as part of the user interface session enabling the user to select encryption of the message and input an encryption key, respectively, the application runtime environment configured for invoking a resource configured for encrypting the message, received in unencrypted form from the requesting device as part of the user interface session, into an encrypted file based on the encryption key supplied by the user via the requesting device as part of the user interface session, and outputting an encrypted message including the encrypted file for storage in the IP-based subscriber message store for the identified destination subscriber the resource and the encrypting distinct from the requesting device.

21. The server of claim 20, wherein the application runtime environment is configured for generating for the encrypted message a MIME extension specifying that the encrypted file has an encrypted format, and a message transport header specifying an IP based destination address corresponding to the identified destination subscriber.

22. The server of claim 20, wherein the IP-based interface includes an application programming interface configured for invoking prescribed routines, including a first routine for accessing the IP-based subscriber profile directory according to LDAP protocol, and a second routine for accessing the IP-based subscriber message store according to at least one of SMTP protocol and IMAP protocol.

23. The server of claim 22, wherein the application programming interface is configured for implementing the invoking of the resource by the application runtime environment for generation of the encrypted message.

24. The server of claim 20, wherein the application runtime environment is further configured for generating a second user interface session for a second requesting device enabling the identified destination subscriber using the second requesting device to retrieve stored messages, the application runtime environment, in response to detecting one of the stored messages as encrypted, generating a third prompt for the second requesting device as part of the second user interface session to enable the identified destination subscriber to input a decryption key, the application runtime environment configured for invoking a second resource configured for attempting decryption of the one stored message based on the decryption key input by the user via the second requesting device as part of the user interface session, the second resource distinct from the requesting device and the second requesting device.

25. The server of claim 24, wherein the application runtime environment, upon obtaining a decryption result based on the attempted decryption, outputs the decryption result for attempted presentation to the identified destination subscriber independent of whether the decryption key enabled successful decryption of the one stored message.

26. The server of claim 20, wherein the interface is configured for receiving the request, and outputting responses, according to hypertext transport protocol.

27. A unified communications server comprising:
an interface configured for receiving from a requesting device a request for generation of a user interface session by the unified communications server to enable a messaging subscriber using the requesting device to retrieve stored messages;
an IP-based interface enabling retrieval of subscriber profile attributes for the messaging subscriber from an IP-based subscriber profile directory that is distinct from the requesting device, and access of messaging information for the messaging subscriber from an IP-based subscriber message store that is distinct from the requesting device; and
an application runtime environment configured for generating the user interface session and accessing the subscriber profile attributes, the application runtime environment configured for generating, based on identifying from the messaging information that one of the stored messages is encrypted, a prompt output to the requesting device as part of the user interface session enabling the messaging subscriber to input a decryption key, the application runtime environment configured for invoking a resource configured for attempting decryption of the one stored message into a decryption result based on the decryption key supplied by the user via the requesting device as part of the user interface session, the resource and the attempting decryption being distinct from the requesting device.

28. The server of claim 27, wherein the application runtime environment is configured for outputting the decryption result to the messaging subscriber independent of whether the decryption key enabled successful decryption of the one stored message.

29. The server of claim 27, wherein the application runtime environment identifies that the one stored message is encrypted based on an attached MIME extension specifying an encrypted format.

30. The server of claim 27, wherein the IP-based interface includes an application programming interface configured for invoking prescribed routines, including a first routine for accessing the IP-based subscriber profile directory according to LDAP protocol, and a second routine for accessing the IP-based subscriber message store according to IMAP protocol.

31. The server of claim 30, wherein the application programming interface is configured for implementing the invoking of the resource by the application runtime environment for generation of the decryption result.

32. The server of claim 27, wherein the interface is configured for receiving the request, and outputting responses, according to hypertext transport protocol.

33. A computer readable medium having stored thereon sequences of instructions for a device receiving a message for an identified messaging subscriber, the sequences of instructions including instructions for performing the steps of:
receiving from a requesting device a request for providing a user interface session by the device executing the instructions to enable a user of the requesting device to send a message to an identified destination subscriber;
receiving the message in unencrypted form from the requesting device as part of the user interface session;
generating and outputting to the requesting device as part of the user interface session a first prompt enabling the user to select encryption of the message;
generating and outputting to the requesting device as part of the user interface session a second prompt, based on the user selecting encryption of the message, for the user to input an encryption key;
invoking a resource configured for executing encryption of the message, having been received in unencrypted form, into an encrypted message based on the encryption key received from the requesting device as part of the user interface, the resource and the executing encryption being distinct from the requesting device; and
outputting the encrypted message to a determined destination based on determined subscriber profile attributes for the identified destination subscriber.

34. The medium of claim 33, wherein the step of receiving the message includes receiving a message data file having the message and a Multipurpose Internet Mail Extension (MIME) that specifies a format of the message, the invoking step including encrypting the message data file into an encrypted file having a MIME extension specifying that the encrypted file has an encrypted format.

35. The medium of claim 34, wherein the invoking step further including generating a message transport header specifying an IP based destination address corresponding to the identified destination subscriber.

36. The medium of claim 34, wherein the message data file has a MIME extension specifying a ".wav" format, the message having an audio header and audio payload, the invoking step including encrypting the audio header and the audio payload within the encrypted file.

37. The medium of claim 33, further comprising instructions for performing the step of determining the subscriber profile attributes for the identified destination subscriber based on accessing a subscriber directory according to Lightweight Directory Access Protocol (LDAP), the subscriber profile attributes specifying the determined destination.

38. The medium of claim 33, wherein the outputting step includes outputting the encrypted message to the determined destination according to at least one of SMTP protocol and IMAP protocol.

39. The medium of claim 33, further comprising instructions for performing the steps of:
receiving from a second requesting device a request for providing a second user interface session by the device to enable the identified destination subscriber using the second requesting device to retrieve stored messages;
retrieving for the second user interface session information related to the stored messages for the identified destination subscriber;

detecting one of the stored messages as encrypted;
generating for the second requesting device as part of the second user interface session a third prompt, based on detecting the one stored message, for the identified destination subscriber to input a decryption key; and
supplying the decryption key having been received from the second requesting device as part of the second user interface session and the one stored message to an invoked decryption utility for decryption of the one stored message into a decrypted data file, the invoked decryption utility and the decryption distinct from the requesting device and the second requesting device.

40. The medium of claim 39, further comprising instructions for performing the step of outputting a decryption result, having been received from the invoked decryption utility relative to the supplying of the decryption key and one stored message, during the second user interface session to the identified destination subscriber, independent of the encryption key matching the decryption key.

41. The medium of claim 33, wherein the receiving step includes receiving the request according to hypertext transport protocol, each of the steps of generating the first prompt and generating the second prompt including sending a corresponding HTML page specifying the corresponding prompt, the step of receiving the message includes receiving the message as an HTTP post to a prescribed uniform resource location.

42. A computer readable medium having stored thereon sequences of instructions for a device retrieving a message for a messaging subscriber, the sequences of instructions including instructions for performing the steps of:
receiving from a requesting device a request for providing a user interface session by the device executing the instructions to enable a messaging subscriber using the requesting device to retrieve stored messages;
accessing, for the user interface session, subscriber profile information from a subscriber profile directory according to a prescribed open network protocol, the subscriber profile directory distinct from the requesting device;
determining one of the stored messages is encrypted based on access of a message store according to a prescribed open network protocol and based on the accessed subscriber profile information;
generating and outputting to the requesting device as part of the user interface session a prompt, based on identifying the one stored message as encrypted, for the messaging subscriber to input a decryption key; and
invoking a resource configured for attempting decrypting of the one stored message based on the decryption key having been supplied by the messaging subscriber via the requesting device as part of the user interface session, the resource and the attempting decrypting being distinct from the requesting device.

43. The medium of claim 42, further comprising instructions for performing the steps of:
obtaining a decryption result based on the invoking step; and
outputting the decryption result for attempted presentation to the messaging subscriber.

44. The medium of claim 43, wherein the outputting step includes outputting the decryption result independent of whether the decryption key enabled successful decryption of the one stored message.

45. The medium of claim 42, further comprising instructions for performing the step of obtaining, based on the invoking step, a decryption result including a message data file having a message and a Multipurpose Internet Mail Extension (MIME) that specifies a format of the message.

46. The medium of claim 42, wherein the receiving step includes receiving the request according to hypertext transport protocol, wherein the step of generating the prompt includes outputting a first HTML page specifying the prompt.

47. The medium of claim 42, wherein the accessing step includes obtaining the subscriber profile information according to LDAP protocol.

48. The medium of claim 47, wherein the determining step includes:
accessing the message store according to IMAP protocol for messaging information related to the stored messages for the messaging subscriber, based on the accessed subscriber profile information; and
identifying the one stored message as encrypted based on a prescribed file extension specifying that the one stored message has an encrypted format.

49. The medium of claim 48, wherein the identifying step includes identifying the prescribed file extension as a MIME type extension that specifies an encrypted format.

50. The medium of claim 42, wherein the determining step includes:
accessing the message store according to IMAP protocol for messaging information related to the stored messages for the messaging subscriber, based on the accessed subscriber profile information; and
identifying the one stored message as encrypted based on a prescribed file extension specifying that the one stored message has an encrypted format.

51. The medium of claim 50, wherein the identifying step includes identifying the prescribed file extension as a MIME type extension that specifies an encrypted format.

52. A unified communications system comprising:
means for receiving from a requesting device a request for providing a user interface session by the system to enable a user of the requesting device to send a message to an identified destination subscriber, the means for receiving configured for receiving the message in unencrypted form from the requesting device as part of the user interface session;
means for generating and outputting to the requesting device as part of the user interface session a first prompt enabling the user to select encryption of the message;
means for generating and outputting to the requesting device as part of the user interface session a second prompt, based on the user selecting encryption of the message, for the user to input an encryption key;
means for invoking a resource configured for executing encryption of the message, having been received in unencrypted form, into an encrypted message based on the encryption key received from the requesting device as part of the user interface session, the resource and the executing encryption distinct from the requesting device; and
means for outputting the encrypted message to a determined destination based on determined subscriber profile attributes for the identified destination subscriber.

53. The system of claim 52, wherein the means for receiving is configured for receiving the message within a message data file having the message and a Multipurpose Internet Mail Extension (MIME) that specifies a format of the message, the means for invoking configured for causing encryption of the message data file into an encrypted file having a MIME extension specifying that the encrypted file has an encrypted format.

54. The system of claim 53, wherein the means for invoking is configured for generating a message transport header specifying an IP based destination address corresponding to the identified destination subscriber.

55. The system of claim 53, wherein the message data file has a MIME extension specifying a ".wav" format, the message having an audio header and audio payload, the means for invoking causing the audio header and the audio payload to be encrypted within the encrypted file.

56. The system of claim 52, further comprising means for determining the subscriber profile attributes for the identified destination subscriber based on accessing a subscriber directory according to Lightweight Directory Access Protocol (LDAP), the subscriber profile attributes specifying the determined destination.

57. The system of claim 52, wherein the outputting means is configured for outputting the encrypted message to the determined destination according to at least one of SMTP protocol and INAP protocol.

58. The system of claim 52, wherein the receiving means also is configured for receiving a request from a second requesting device for providing a second user interface session by the system to enable the identified destination subscriber using the second requesting device to retrieve stored messages, the system further comprising:
means for retrieving for the second user interface session information related to the stored messages for the identified destination subscriber;
means for detecting one of the stored messages as encrypted;
means for generating for the second requesting device as part of the second user interface session a third prompt, based on detecting the one stored message, for the identified destination subscriber to input a decryption key; and
means for supplying the decryption key having been received from the second requesting device as part of the second user interface session and the one stored message to an invoked decryption utility for decryption of the one stored message into a decrypted data file, the invoked decryption utility and the decryption distinct from the requesting device and the second requesting device.

59. The system of claim 58, further comprising means for outputting a decryption result, having been received from the invoked decryption utility relative to the supplying of the decryption key and one stored message, during the second user interface session to the identified destination subscriber, independent of the encryption key matching the decryption key.

60. The system of claim 52, wherein the receiving means is configured for receiving the request according to hypertext transport protocol, wherein the first prompt is output in an HTML page to the requesting device, the second prompt output to in a second HTML page to the requesting device, the message received as an HTTP post to a prescribed uniform resource location.

61. A unified communications system comprising:
means for receiving from a requesting device a request for providing a user interface session by the system to enable a messaging subscriber using the requesting device to retrieve stored messages;
means for accessing, for the user interface session, subscriber profile information from a subscriber profile directory according to a prescribed open network protocol, the subscriber profile directory distinct from the requesting device;
means for determining one of the stored messages is encrypted based on access of a message store according to a prescribed open network protocol and based on the accessed subscriber profile information;
means for generating and outputting to the requesting device as part of the user interface session a prompt, based on identifying the one stored message as encrypted, for the messaging subscriber to input a decryption key; and
means for invoking a resource configured for attempting decrypting of the one stored message based on the decryption key having been supplied by the messaging subscriber via the requesting device as part of the user interface session, the resource and the attempting decrypting being distinct from the requesting device.

62. The system of claim 61, further comprising:
means for obtaining a decryption result based on the invoking of the resource; and
means for outputting the decryption result for attempted presentation to the messaging subscriber.

63. The system of claim 62, wherein the outputting means is configured for outputting the decryption result independent of whether the decryption key enabled successful decryption of the one stored message.

64. The system of claim 61, wherein the means for invoking obtains a decryption result including a message data file having a message and a Multipurpose Internet Mail Extension (MIME) that specifies a format of the message.

65. The system of claim 61, wherein the receiving means is configured for receiving the request according to hypertext transport protocol, wherein the prompt is output in an HTML page to the requesting device.

66. The system of claim 61, wherein the accessing means is configured for obtaining the subscriber profile information according to LDAP protocol.

67. The system of claim 66, wherein the determining means is configured for:
accessing the message store according to IMAP protocol for messaging information related to the stored messages for the messaging subscriber, based on the accessed subscriber profile information; and
identifying the one stored message as encrypted based on a prescribed file extension specifying that the one stored message has an encrypted format.

68. The system of claim 67, wherein the determining means identifies the prescribed file extension as a MIME type extension that specifies an encrypted format.

69. The system of claim 61, wherein the determining means is configured for:
accessing the message store according to IMAP protocol for messaging information related to the stored messages for the messaging subscriber, based on the accessed subscriber profile information; and
identifying the one stored message as encrypted based on a prescribed file extension specifying that the one stored message has an encrypted format.

70. The system of claim 69, wherein the determining means is configured for identifying the prescribed file extension as a MIME type extension that specifies an encrypted format.

* * * * *

UNITED STATES PATENT AND TRADEMARK OFFICE
CERTIFICATE OF CORRECTION

| | | |
|---|---|---|
| PATENT NO. | : 7,308,477 B2 | Page 1 of 1 |
| APPLICATION NO. | : 09/756697 | |
| DATED | : December 11, 2007 | |
| INVENTOR(S) | : Gress et al. | |

It is certified that error appears in the above-identified patent and that said Letters Patent is hereby corrected as shown below:

Column 14, line 41: Please insert a comma after the word "subscriber".

Signed and Sealed this

Sixth Day of May, 2008

JON W. DUDAS
*Director of the United States Patent and Trademark Office*